(No Model.)

S. R. DRESSER.
Packing for Artesian Wells.

No. 227,419. Patented May 11, 1880.

Witnesses
Chas H Smith
Harold Serrell

Inventor
Solomon R. Dresser
per Lemuel W. Serrell
Atty

UNITED STATES PATENT OFFICE.

SOLOMON R. DRESSER, OF BRADFORD, PENNSYLVANIA.

PACKING FOR ARTESIAN WELLS.

SPECIFICATION forming part of Letters Patent No. 227,419, dated May 11, 1880.

Application filed March 29, 1880. (No model.)

*To all whom it may concern:*

Be it known that I, SOLOMON R. DRESSER, of Bradford, in the county of McKean and State of Pennsylvania, have invented an Improvement in Well-Packings, of which the following is a specification.

In oil and other wells india-rubber has been used as a packing against the rock to separate the water and other materials that are above a given level from those that are below. In some instances the weight of the upper tube has acted to expand a cylinder of rubber and bring its upper edge in contact with the rock; but when the tube has to be drawn this rubber adheres to the rock and rolls over and wedges so tightly that it is substantially immovable. In other instances the top and bottom ends of a cylinder of india-rubber have been grooved externally and grasped by a divided collar; but the parts are difficult to make and the rubber is liable to slip out from its collar.

My present invention consists in the combination, with the india-rubber cylinder, of internal and external clamping mechanism, whereby the upper end of the india-rubber is securely held and can be drawn upon with sufficient force to stretch the cylinder and cause it to leave the rock and draw up freely, and when in use the weight of the well-tube that rests upon the rubber cylinder causes it to expand and tightly fill the bore of the Artesian well; and I make use of an annular bearing for the bottom end of the cylinder, which bearing is connected with the lower well-tube and with the upper well-tube in such a manner that the downward movement of the upper well-tube in expanding the india-rubber is allowed for without risk of the parts leaking.

Figure 1:
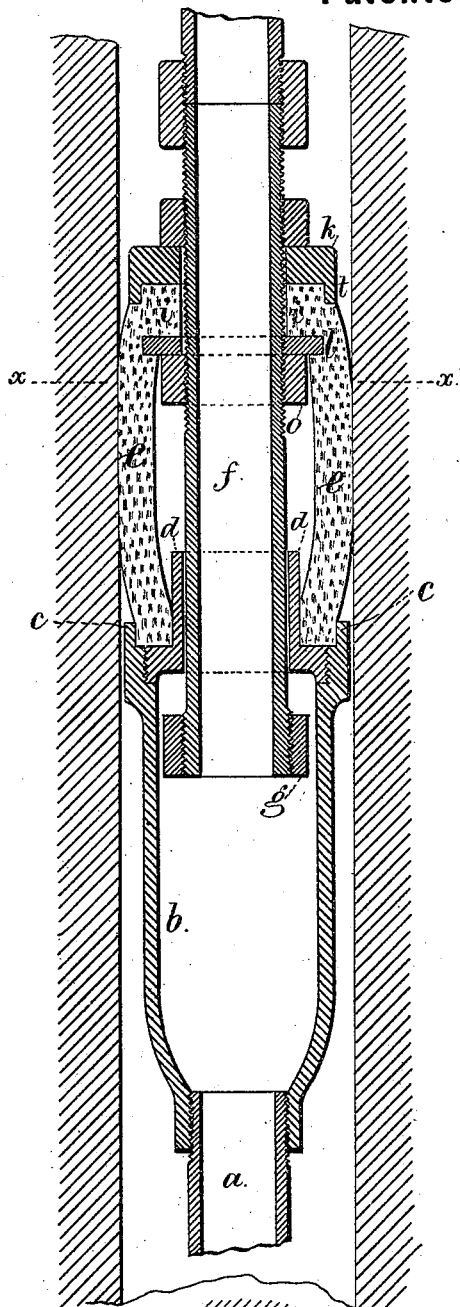
Figure 2:
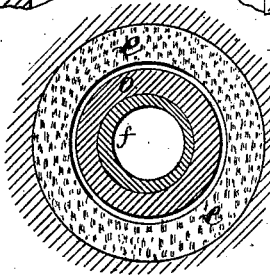

In the drawings I have shown, in Figure 1, a vertical section of the packing and the parts therewith connected, and Fig. 2 is a sectional plan at the line *x x*.

The lower well-tube, *a*, is screwed into the case *b*, the upper end of which has two annular flanges, *c* and *d*, to form a bearing, between which the lower end of the india-rubber cylinder *e* is received.

The upper well-tube, *f*, passes through the flange *d*, and has around its end a collar, *g*, that causes the upper well-tube, *f*, to lift the case *b* and lower tube, *a*, in drawing up the well-tube; but said tube *f* may slide freely downward through the flange *d* to the extent that is necessary in expanding the rubber packing *e*.

The rubber cylinder *e* is made with a hole through the center. The upper part of this hole is the same diameter as the pipe *f*, and the lower part is considerably larger; hence a shoulder or offset is produced, which should be near the upper end of the rubber cylinder. This shoulder is shown at *i*, and it is preferable to introduce a metal ring, *l*, into the rubber at this shoulder, as shown, before the rubber is vulcanized. There is a collar, *o*, around the pipe *f* within the rubber *e*, or said pipe *f* is made with an offset or shoulder in place of the collar, and the cap *k* surrounds the pipe *f* above the rubber *e*, and has a flange, *t*, that surrounds the upper end of this rubber cylinder *e*. The cap *k* is screwed upon the tube *f*, or is acted upon by a nut that surrounds said tube *f*, so that the upper part of the cylinder of rubber is clamped firmly between the said cap *k* and the collar or offset *o*, said collar *o* being in contact with the shoulder or ring *l* within the rubber packing.

It will now be understood that the tubes *a* and *f* are lowered into the well, the tube *f* suspending, by its collar *g*, the flange *d*, case *b*, and pipe *a*, and the rubber cylinder being between *c* and *d* at one end, *l t k* at the other end; but there is no pressure upon the rubber to expand the same; hence the cylinder *e* can be moved freely up or down the well.

As soon as the lower end of the well-tube *a* touches the bottom of the well, or the case *b* is otherwise firmly supported, then the weight of the upper tube, *f*, rests upon the rubber cylinder *e*, and the flange *k t* presses upon the rubber endwise, shortening the same, and spreading the central part of the rubber cylinder and forcing it firmly against the rock walls of the well, and shutting off any water or other material from the upper part of the well. The tube *f* slides down through the flange *d* to the extent that the rubber cylinder *e* is shortened.

The rubber packing confines any materials that are below it, and sometimes causes the liquid to rise in the well-tube or to overflow.

I claim as my invention—

1. The combination, with the well-tubes $a$ and $f$ and rubber packing $e$, of the cap $k$, having a flange, $t$, to inclose the upper end of the rubber, the offset or shoulder at $i$ within the rubber, the collar or offset $o$ around the tube $f$, and the support for the lower end of the rubber $e$, substantially as set forth.

2. The tube $a$, case $b$, and flanges $c\ d$, in combination with the tube $f$, passing through the flange $d$, the rubber-packing cylinder between the flanges $c\ d$, the cap $k$ and flange $t$, inclosing the upper end of the rubber $e$, and the collar or offset $o$, for lifting the rubber, substantially as set forth.

Signed by me this 24th day of March, A. D. 1880.

S. R. DRESSER.

Witnesses:
WILLIAM G. MOTT,
CHAS. H. SMITH.